(12) United States Patent
Hyun

(10) Patent No.: US 9,072,284 B2
(45) Date of Patent: Jul. 7, 2015

(54) FISHING REEL HAVING QUICK-OPENING SIDE COVER

(71) Applicant: DOYO ENGINEERING CO., LTD., Bucheon (KR)

(72) Inventor: Kwang-Ho Hyun, Bucheon (KR)

(73) Assignee: DOYO ENGINEERING CO., LTD. (KR)

( * ) Notice: Subject to any disclaimer, the term of this patent is extended or adjusted under 35 U.S.C. 154(b) by 120 days.

(21) Appl. No.: 13/910,362

(22) Filed: Jun. 5, 2013

(65) Prior Publication Data

US 2013/0320125 A1 Dec. 5, 2013

(30) Foreign Application Priority Data

Jun. 5, 2012 (KR) .................. 10-2012-0060116
Apr. 26, 2013 (KR) .................. 10-2013-0046958

(51) Int. Cl.
*A01K 89/01* (2006.01)
*A01K 89/00* (2006.01)
*A01K 89/015* (2006.01)

(52) U.S. Cl.
CPC ............... *A01K 89/00* (2013.01); *A01K 89/015* (2013.01)

(58) Field of Classification Search
USPC .................. 242/310, 313, 314, 315
See application file for complete search history.

(56) References Cited

U.S. PATENT DOCUMENTS

| | | | | |
|---|---|---|---|---|
| 6,032,894 | A * | 3/2000 | Chapman et al. | 242/310 |
| 6,460,793 | B1 * | 10/2002 | Hirayama et al. | 242/313 |
| 7,350,730 | B2 * | 4/2008 | Hyun | 242/314 |
| 2007/0246590 | A1 * | 10/2007 | Hyun | 242/310 |

FOREIGN PATENT DOCUMENTS

| | | |
|---|---|---|
| KR | 100320405 | 12/2001 |
| KR | 200345067 | 3/2004 |
| KR | 200426604 | 9/2006 |

* cited by examiner

*Primary Examiner* — Emmanuel M Marcelo
(74) *Attorney, Agent, or Firm* — Cantor & Colburn LLP

(57) ABSTRACT

A fishing reel having a side cover that can be opened and closed in order to attach and detach a spool or the like. The fishing reel having the quick-opening side cover can be operated with one hand, in which a quick-opening system is employed such that a fisher can open the side cover by moving a lock by manipulating it with one hand. A grip of the lock can stay in the protruded state when the side cover is opened such that the fisher can close the side cover surely and securely, thereby preventing the side cover from being opened during fishing.

8 Claims, 16 Drawing Sheets

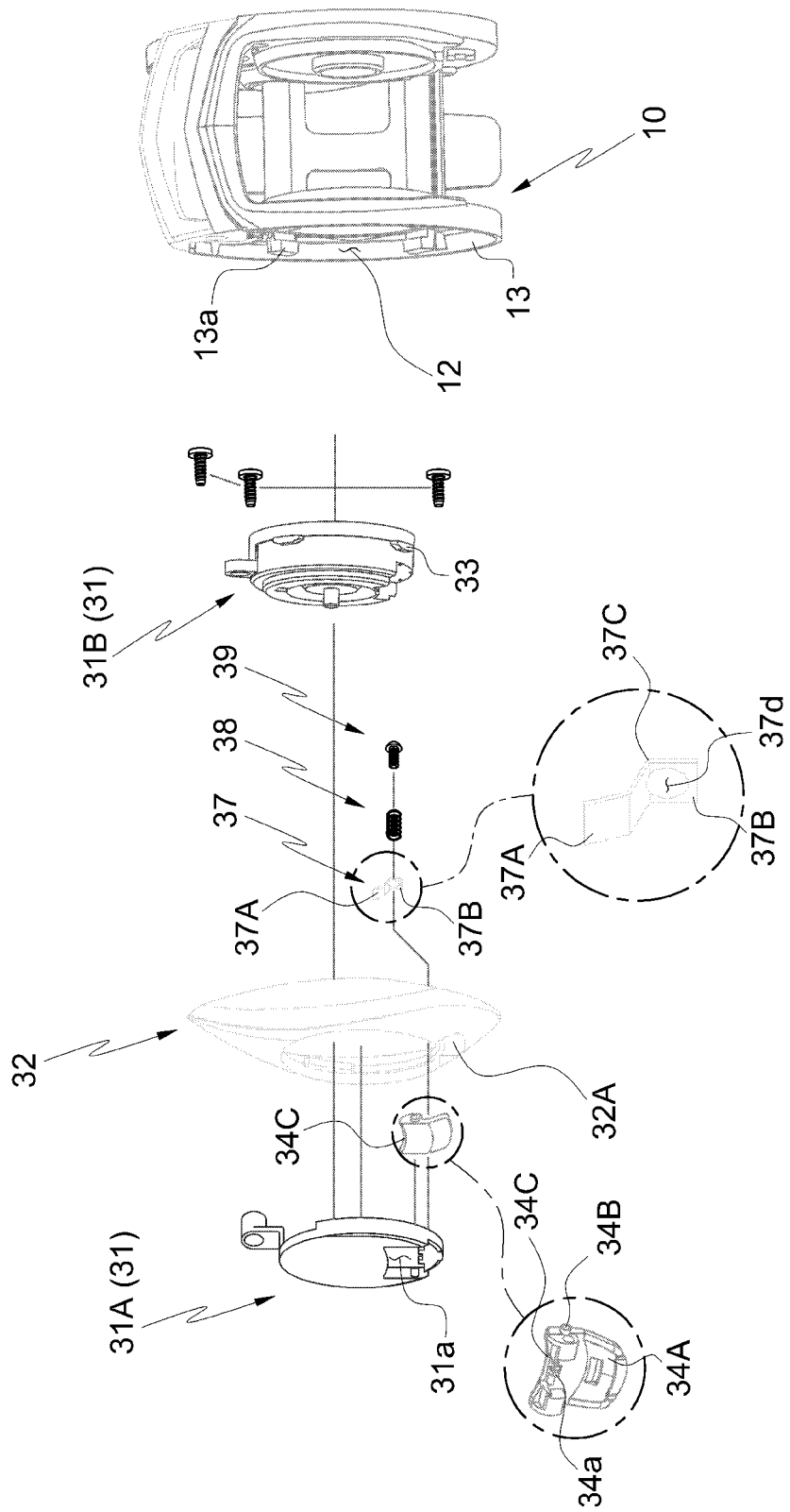

FISHING REEL HAVING QUICK-OPENING SIDE COVER

BACKGROUND OF THE INVENTION

1. Field of the Invention

The present invention relates to a fishing reel having a side cover that can be opened and closed in order to attach and detach a spool or the like, and more particularly, to a fishing reel having a quick-opening side cover which can be operated with one hand, in which a quick-opening system is employed such that a fisher can open the side cover by moving a lock by manipulating it with one hand, the open state can be maintained when a fitting portion of a mounting part and a fitting body of the lock are coupled to each other and the closed state can be maintained when the locking rod is coupled to a locking hole by an elastic means, and a grip of the lock can stay in the protruded state when the side cover is opened such that the fisher can close the side cover surely and securely, thereby preventing the side cover from being opened during fishing.

2. Description of the Related Art

In fishing, when a reel or a bait reel is used, a fishing hook having bait is cast. In some cases, fishing lines become tangled, and are required to be untangled.

During casting, once the fishing hook has been cast, the spool on which the fishing line is wound may keep rotating due to inertia, thereby causing backlash in which the fishing line overlaps and becomes tangled. For instance, it is required to control the braking force of a braking system that is introduced to prevent backlash.

Due to of a variety of reasons, it is required to open and close the side cover coupled to a frame of the fishing reel and maintain the firmness of the closed state.

Regarding a mechanism of opening and closing the side cover, the applicant of the present invention proposed Korean Patent No. 10-0320405 (Dec. 28, 2001), titled "STRUCTURE FOR ATTACHING/DETACHING SIDE COVER OF DOUBLE BEARING TYPE REEL FOR FISHING."

This patent provides advantages in that a part can be manually attached or detached without the use of a tool so that it can be easily and rapidly replaced or adjusted. The side cover is firmly assembled, and can be assembled to or disassembled from a reel body.

However, since this patent employs a push button on a side of the side cover which is to be actually opened, the cover can be opened when it is pressed during fishing, regardless whether it is a result of an intended or unintended action, which is problematic.

In addition, Korean Registered Utility Model No. 20-0345067 (Mar. 4, 2004), titled "SIDE COVER LOCKING DEVICE OF FISHING REEL," was proposed by the applicant of the present invention.

This utility model promotes a reliable locking function so that a beginner can safely and easily use the fishing reel. This also has a simple structure and superior endurance.

The locking device has the following advantages: The locked state can be correctly identified by sound, and the side cover can be reliably locked. In the locked state, the elastic force of a spring acts so as to keep the side cover in a safe state. Considering the structure of the locking device, substantially no defects occur, and it is easy to use and assemble the locking device, thereby improving productivity and endurance. Since substantially no defects occur, the economic competitiveness of the locking device is excellent.

However, this utility model also has a danger of being accidently opened when it is unintentionally pushed.

Next, Korean Registered Utility Model No. 20-0426604 (Sep. 8, 2006), titled "DEVICE FOR ATTACHING/DETACHING SIDE COVER OF DOUBLE BEARINGS TYPE FISHING REEL," was also proposed by the applicant of the present invention.

This utility model provides a device for attaching/detaching a side cover of a double bearing type fishing reel which can be simply manipulated and allows the side cover to be reliably separated and assembled.

Specifically, in the device for attaching/detaching a side cover of a double bearing type fishing reel, a reel frame has a spool rotatably mounted thereon, and a side cover can be separated from and assembled to a side of the reel frame. The device includes a boss which is formed inside the side cover and has a stop hole in the central portion thereof and a slope around the leading end thereof. A rod extends through the reel frame and the side cover, and in this state, can be selectively inserted into the stop hole of the boss by moving to the left and right. A spring is inserted into the outer circumference of the rod, and elastically supports the movement of the rod to the left and right.

However, in this utility model, a portion for pulling a lever (expressed as a 'rod' in this utility model) is disposed opposite the side cover that is actually opened and closed. Accordingly, both hands must be used to open the side cover, which is inconvenient.

The information disclosed in the Background of the Invention section is only for the enhancement of understanding of the background of the invention, and should not be taken as an acknowledgment or any form of suggestion that this information forms a prior art that would already be known to a person skilled in the art.

SUMMARY OF THE INVENTION

Accordingly, the present invention has been made keeping in mind the above problems occurring in the related art, and the present invention is intended to provide a fishing reel that employs a quick-opening system in order to provide a quick-opening side cover structure, in which a user can convert a lock into an unlocked state by pulling it with one hand, an open state can be maintained when a fitting portion of a mounting part and a fitting body of the lock are coupled to each other, and a closed state can be maintained when a locking rod of the lock and a locking hole are coupled to each other by an elastic means.

It is also intended to provide a fishing reel having a quick-opening side cover that can be manipulated with one hand, in which a grip of the lock stays in the protruded state in the open state of the side cover, so that a fisher can close the side cover surely and securely, thereby preventing the side cover from being accidently opened during fishing.

It is also intended to provide a fishing reel having a quick-opening side cover that can be manipulated with one hand, in which various types of up-down lift displacement means are provided. The up-down lift displacement means can lift up and down the fitting body of the lock in order to maintain the unlocked state by displacing the fitting body so that it is coupled with the fitting portion of the mounting part after converting the locking rod of the lock into the unlocked state by pulling the locking rod from the locking hole in which the locking rod is locked.

It is also intended to provide a fishing reel having a quick-opening system, in which the mounting part has a clearance that makes it easy to access the grip of the lock.

It is also intended to provide a fishing reel having a quick-opening system, in which the locking rod includes a first locking rod and a second locking rod which is implemented as a hole member having the locking hole, so that the side cover can be opened when the first or second locking rod is simply pulled from an either side so as to be unlocked.

It is also intended to provide a fishing reel having a modified quick-opening system, in which a screw-coupling part is introduced to the locking rod as a complementary device which prevents the first side cover from being accidently opened and lifts it in the unlocked state. The first side cover can be opened by disengaging male threads from female threads and pulling the locking rod. Even though the locking hole and the locking tip are in the coupled state during locking, the grip of the lock is exposed to the outside of the side cover unless the male and female threads are engaged with each other. Accordingly, the fisher can recognize this and perfectly couple them to each other.

In order to achieve the above object, according to one aspect of the present invention, there is provided a fishing reel that includes: a frame; a shaft disposed in the frame; a spool axially disposed on the shaft, wherein a fishing line is wound on the spool; a first side cover provided at a side of the frame, the first side cover being openable for separation from the spool; a second side cover arranged opposite the first side cover, the second side cover being coupled to the frame; and a quick-opening system. The quick-opening system includes: a mounting part provided in the first side cover, and having a fitting portion and a reciprocating hole; a lock having a locking rod which advances and retreats along the reciprocating hole of the mounting part and a fitting body connected to the locking rod, wherein the fitting body is coupled to the fitting portion when the first side cover is opened; a locking hole which couples with one end of the locking rod, the locking hole being provided in one of the frame and the second side cover; and an elastic means, wherein the elastic means is coupled to the lock so as to apply an elastic force in a direction in which the locking rod of the lock is coupled to the locking hole.

According to another aspect of the present invention, there is provided a fishing reel that includes: a frame; a shaft disposed in the frame; a spool axially disposed on the shaft, wherein a fishing line is wound on the spool; a first side cover provided at a side of the frame, the first side cover being openable for separation from the spool; a second side cover arranged opposite the first side cover, the second side cover being coupled to the frame; and a quick-opening system. The quick-opening system includes: a mounting part provided in the second side cover, and having a fitting portion and a reciprocating hole; a lock having a locking rod which advances and retreats along the reciprocating hole of the mounting part and a fitting body connected to the locking rod, wherein the fitting body is coupled to the fitting portion when the first side cover is opened; a locking hole which couples with one end of the locking rod, the locking hole being provided in the first side cover; and an elastic means, wherein the elastic means is coupled to the lock so as to apply an elastic force in a direction in which the locking rod of the lock is coupled to the locking hole.

According to an embodiment of the present invention, the fitting body of the lock may have an up-down lift displacement means.

It is preferable that the lock has a grip, and that the mounting part has a clearance which allows a finger to reach the grip.

The fishing reel may further include a locking means for rotating the lock so that the first side cover opens or closes the side of the frame. The locking means includes a grip which is coupled to the lock so as to swing in a lateral direction and an elastic support means disposed inside the lock. When the grip has completed swinging in one direction for unfolding or folding, the elastic support means causes the swing of the grip to stop at one of an unfolded state and a folded state.

The grip may have a holding portion, a head portion connected to the holding portion, a swing shaft protruding from both ends of the head and a holding protrusion protruding from an inner surface of the head portion. The elastic support means may have a leaf spring having a contact portion which applies an elastic force in an outward direction while contacting the holding protrusion.

The leaf spring may have a support portion connected to the contact portion thereof, and the elastic support means may have a coil spring which is coupled to the support of the leaf spring to elastically support the leaf spring in the outward direction. A bolt member for fixing the leaf spring and the coil spring to the lock may be provided. The bolt member is coupled to a screw hole of the lock through a hollow area of the coil spring and a coupling hole of the support portion.

Each of the lock and the first side cover may have an accommodation recess which is recessed so as to receive the grip therein, whereby the lock is prevented from rotating and is in a locked state when received in the accommodation recess.

According to a further aspect of the present invention, there is provided a fishing reel that includes: a frame; a shaft disposed in the frame; a spool axially disposed on the shaft, wherein a fishing line is wound on the spool; a first side cover provided at a side of the frame, the first side cover being openable for separation from the spool; a second side cover arranged opposite the first side cover, the second side cover being coupled to the frame; and a quick-opening system. The quick-opening system includes: a first mounting part provided in the first side cover, and having a reciprocating hole; a second mounting part provided in the second side cover, and having a reciprocating hole; lock comprising a first locking rod which advances and retreats along the reciprocating hole of the first mounting part and a second locking rod which advances and retreats along the reciprocating hole of the second mounting part; a locking tip provided at one end of one of the first locking rod and the second locking rod; a locking hole provided in one of the second locking rod and the first locking rod; and an elastic means, wherein the elastic means is coupled to the first and second locking rods of the lock so as to apply an elastic force in a direction in which the locking tip and the locking hole are coupled to each other.

According to further another aspect of the present invention, there is provided a fishing reel that includes: a frame; a shaft disposed in the frame; a spool axially disposed on the shaft, wherein a fishing line is wound on the spool; a first side cover provided at a side of the frame, the first side cover being openable for separation from the spool; a second side cover arranged opposite the first side cover, the second side cover being coupled to the frame; and a quick-opening system. The quick-opening system includes: a mounting part comprising a reciprocating hole which is formed in one of the first side cover and the second side cover and female threads which are formed in a circumference of the reciprocating hole; a lock comprising a locking rod which advances and retreats along the reciprocating hole of the mounting part, the locking rod having male threads which engage with the female threads of the mounting part and a grip which is exposed to an outside of one of the first side cover and the second side cover; a locking tip provided at one end of the locking rod; a locking hole provided in the second or first side cover, wherein the locking hole couples with the locking tip; and an elastic means, wherein the elastic means is coupled to the lock so as to apply an elastic force in a direction in which the locking rod of the lock is coupled to the locking hole.

As set forth above, the fishing reel having the quick-opening system provides a quick-opening side cover structure, in which a user can convert a lock into an unlocked state by pulling it with one hand, an open state can be maintained when a fitting portion of a mounting part and a fitting body of the lock are coupled to each other, and a closed state can be maintained when a locking rod of the lock and a locking hole are coupled to each other by an elastic means. In addition, the quick-opening side cover can be manipulated with one hand, in which a grip of the lock stays in the protruded state in the open state of the side cover, so that a fisher can close the side cover surely and securely, thereby preventing the side cover from being accidently opened during fishing. Furthermore, various types of up-down lift displacement means are provided. The up-down lift displacement means can lift up and down the fitting body of the lock in order to maintain the unlocked state by displacing the fitting body so that it is coupled with the fitting portion of the mounting part after converting the locking rod of the lock into the unlocked state by pulling the locking rod from the locking hole in which the locking rod is locked. In addition, the mounting part has a clearance that makes it easy to access the grip of the lock.

Furthermore, in the fishing reel having a quick-opening system, the locking rod includes a first locking rod and a second locking rod which is implemented as a hole member having the locking hole, so that the side cover can be opened when the first or second locking rod is simply pulled from an either side so as to be unlocked. In addition, in the fishing reel having a modified quick-opening system, a screw-coupling part is introduced to the locking rod as a complementary device which prevents the first side cover from being accidently opened and lifts it in the unlocked state. The first side cover can be opened by disengaging male threads from female threads and pulling the locking rod. Even though the locking hole and the locking tip are in the coupled state during locking, the grip of the lock is exposed to the outside of the side cover unless the male and female threads are engaged with each other. Accordingly, the fisher can recognize this and perfectly couple them to each other.

BRIEF DESCRIPTION OF THE DRAWINGS

The above and other objects, features and advantages of the present invention will be more clearly understood from the following detailed description when taken in conjunction with the accompanying drawings, in which:

FIG. 9 is an exploded perspective view showing the fishing reel according to an embodiment of the present invention.

DETAILED DESCRIPTION OF THE INVENTION

Figure 1A:
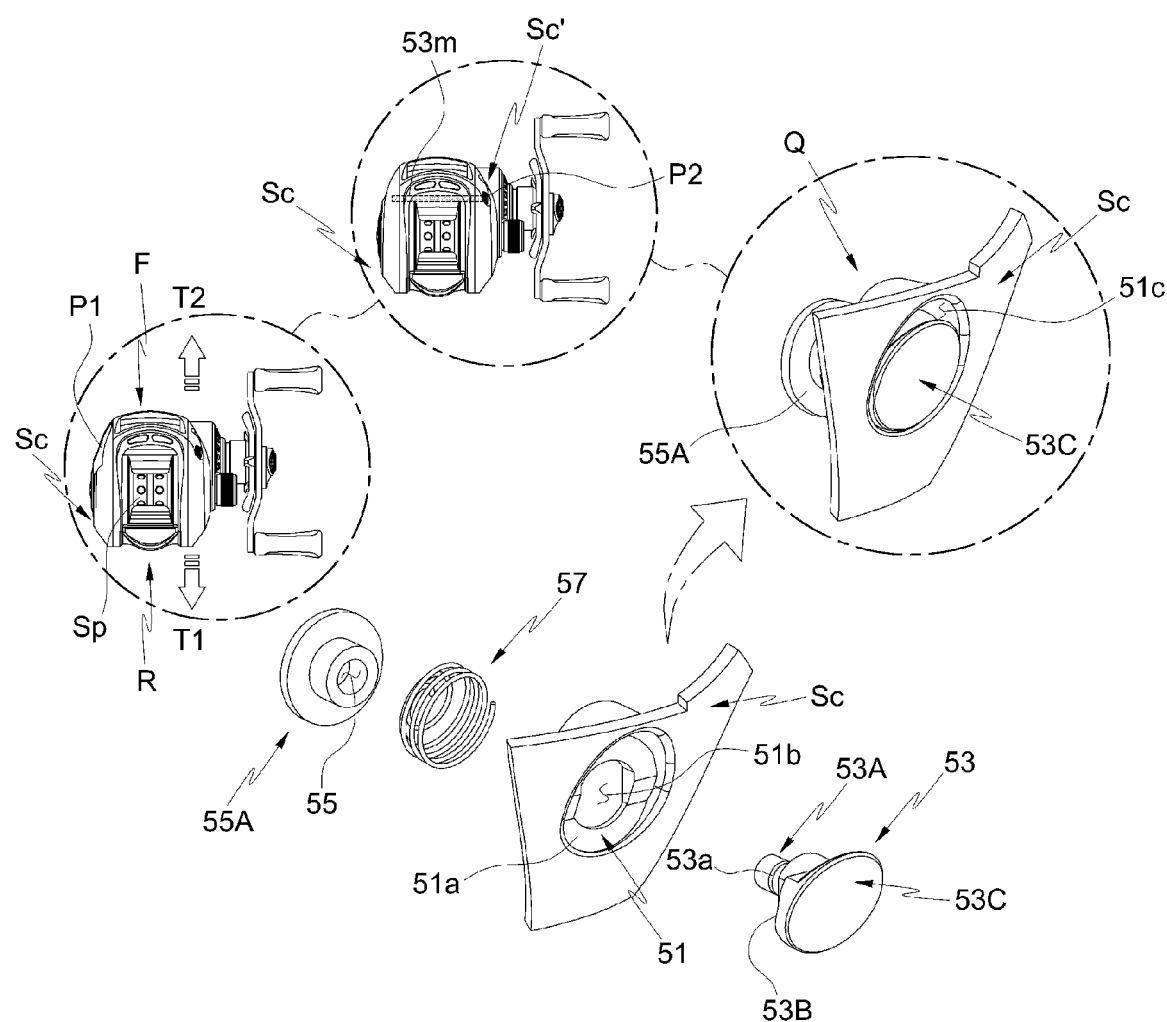
FIG. 1A and FIG. 1B are perspective views showing key parts of a fishing reel having a quick-opening side cover according to an embodiment of the present invention.

Reference will now be made in greater detail to a preferred embodiment of the present invention, an example of which is illustrated in the accompanying drawings. Wherever possible, the same reference numerals will be used throughout the drawings and the description to refer to the same or like parts.

Before the present invention is described in detail, it should be noted that various changes may be made to the present invention, so aspects (or embodiments) of the present invention will be described in detail, merely by way of example. However, it should be understood that the present invention is not limited to a specific embodiment, but embraces all changes, equivalents, and substitutes within the technical idea and scope of the present invention.

The same reference numerals throughout the drawings, that is, the same reference numerals in a second digit and a first digit, or in a second digit, a first digit, and an alphabet character denote elements having the same or similar function. If there is no special mention, the elements denoted by the reference numerals are to be comprehended as the elements complying with the above-mentioned reference scheme.

For clarity and convenience of description, the size or thickness of components shown in the drawings may be exaggerated to be greater (or thicker), be expressed to be smaller (or thinner), or be simplified. However, the scope of the present invention should not be limited thereto.

Terms employed herein are for the purpose of description of particular aspects (or embodiments), and are not intended to limit the present invention. Further, the singular forms "a" and "an" include plural referents unless the context clearly dictates otherwise. In this description, it should be understood that terms such as "include" or "consist of" are inclusive of characteristics, numerals, steps, operations, components, parts or combination thereof, but are not exclusive of one or more different characteristics, numerals, steps, operations, components, parts or combination thereof.

Unless the context clearly defines otherwise, all terms or words used herein have the same meaning as common meaning understood by those skilled in the art. Terms defined in a dictionary are to be interpreted as having the same meaning as meaning used in the related art, and should not be interpreted ideally or excessively unless this application clearly defines otherwise.

When the terms such as "first" and "second" are used herein to designate several components, it should be understood that these terms merely discriminate those components from others but do not limit the sequence of manufacture. These terms may not be identical throughout the Detailed Description of the Invention and the appended Claims.

First, as shown in circles drawn with dashed dotted lines in the upper part of FIG. 1A, a fishing reel having a quick-opening side cover R according to the present invention includes a frame F, a shaft A mounted on the frame, a spool Sp which is axially disposed on the shaft and on which a fishing line is wound, a handle H with which the spool is rotated, and a first side cover Sc which is used for assembling and disassembling the spool.

In the description of the present invention, a part that is not separated in a well-known fishing reel and is provided in the other side of the frame F will be distinctively referred to as 'a second side cover' in consideration of the case where a quick-opening system Q which is a key component of the present invention is mounted on the first side cover Sc (a mounting point 'P1' inside the upper left circle drawn with the dashed dotted line in FIG. 1A) and the case where the quick-opening system Q is mounted on the second side cover Sc' which is arranged at a position opposite the first side cover Sc (a mounting point 'P2' inside the upper central circle drawn with the dashed dotted line in FIG. 1A).

In the case of 'a first aspect' in which the quick-opening system is mounted on the first side cover Sc (all of FIG. 1A, FIG. 1B, FIG. 2A, and FIG. 2B show the first aspect except for 'a second aspect' which is shown inside the upper central circle in FIG. 1A), the quick-opening system Q includes a mounting part 51, a lock 53, a locking hole 55 to which a locking rod 53A of the lock is coupled, and an elastic means which is coupled to the lock such that the locking rod 53A of the lock 53 can have elasticity in the direction in which it is coupled to the locking hole.

This elastic means can be modified using a variety of materials, such as silicone or elastomer, and shapes that can contract and restore the original shape, in addition to a coil spring.

The quick-opening system Q of the 'first aspect' has a mounting part which is provided in the first side cover Sc and the locking hole 55 which is provided in the frame F such that the length of the lock 53 is reduced to that extent. The operation of opening the first side cover is carried out by pulling one of grips 53C of the lock 53 in the first side cover Sc in the direction away from the handle H and then moving it up and down.

In contrast, the quick-opening system Q of the 'second aspect' differs in the following features. The quick-opening system Q has the mounting part which is provided at the side of the second side cover Sc' and the locking hole 55 which is provided in the first side cover Sc. A lock 53m has a length that spans both side covers. The operating of opening the first side cover is carried out by pulling the grip 53C of the lock 53 in the second side cover Sc' in the direction toward the handle H and then moving it up and down.

The 'first aspect' can be modified as required such that the locking hole is arranged at the side of the second side cover and the length of the lock is increased.

Hereinafter, the following description will be presented based on the quick-opening system Q of the 'first aspect,' in particular, the shape in which the locking hole is arranged in the frame F. However, such a construction can be directly applied to the second aspect by suitably modifying the position of arrangement, size and shape. Therefore, the following description cannot be understood as limiting the scope of the present invention.

In the quick-opening system Q of the 'first aspect,' the mounting part 51 is formed in the first side cover Sc, and includes a fitting portion 51a and a reciprocating hole 51b.

In addition, a clearance 51c through which a finger can be inputted is formed in the grip 53C of the lock 53.

In addition, the lock 53 includes the locking rod 53A which advances and retreats along the reciprocating hole 51b of the mounting part 51 and a fitting body 53B which is connected to the locking rod 53A and is coupled to a holding portion 51a when the first side cover Sc is opened.

While the lock is integrally configured, it can be configured such that a plurality of parts is assembled together as required.

In addition, the locking hole 55 is provided at one end of the locking rod 53A, or a locking tip 54, and is provided on the frame F (in the case of the 'first aspect') or the second side cover (in the case of a modified embodiment of the 'first aspect'). The locking hole 55 may be provided on the first side cover (Sc) (in the case of the 'second aspect'). The locking hole can be formed directly in the frame or the like or in a separate member such as a hole member 55A, which is mounted on the frame or the like. The concept of the term 'hole' representatively refers to a female member that corresponds to one end of the locking member which acts as a male member. However, the present invention should not be limited to the shape that is presented by the meaning of that term.

In addition, the elastic means is coupled to the lock such that the locking rod 53A of the lock 53 has elasticity in the direction in which it is coupled to the locking hole 55. In the figures, the elastic means is configured as a coil spring 57, in which one end thereof gradually decreases in diameter, thereby forming a fastening hook 57a which is coupled to the locking rod 53A, in particular, the fastening recess 53a, and the other end thereof is supported on an inner wall coupling portion Sc1 (see FIG. 2B) of the first side cover Sc which is provided with the mounting part 51.

Figure 2A:
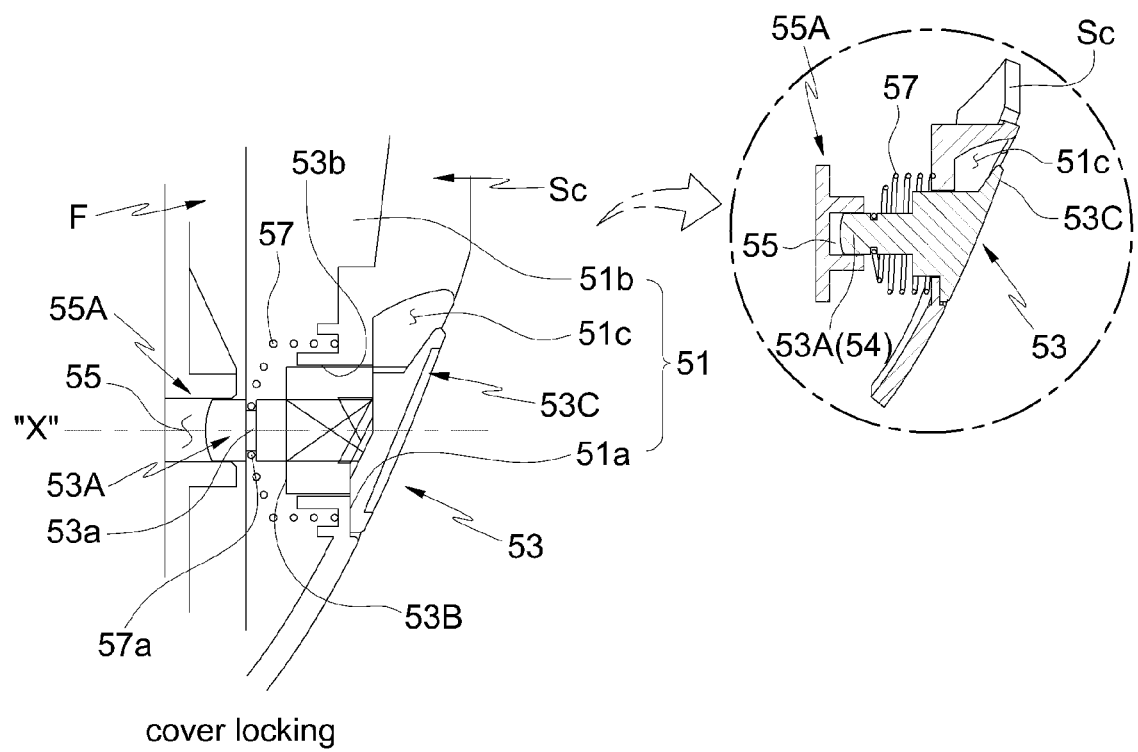
FIG. 2A and FIG. 2B are operation views showing the key parts of the fishing reel having a quick-opening side cover according to an embodiment of the present invention.
Figure 2B:
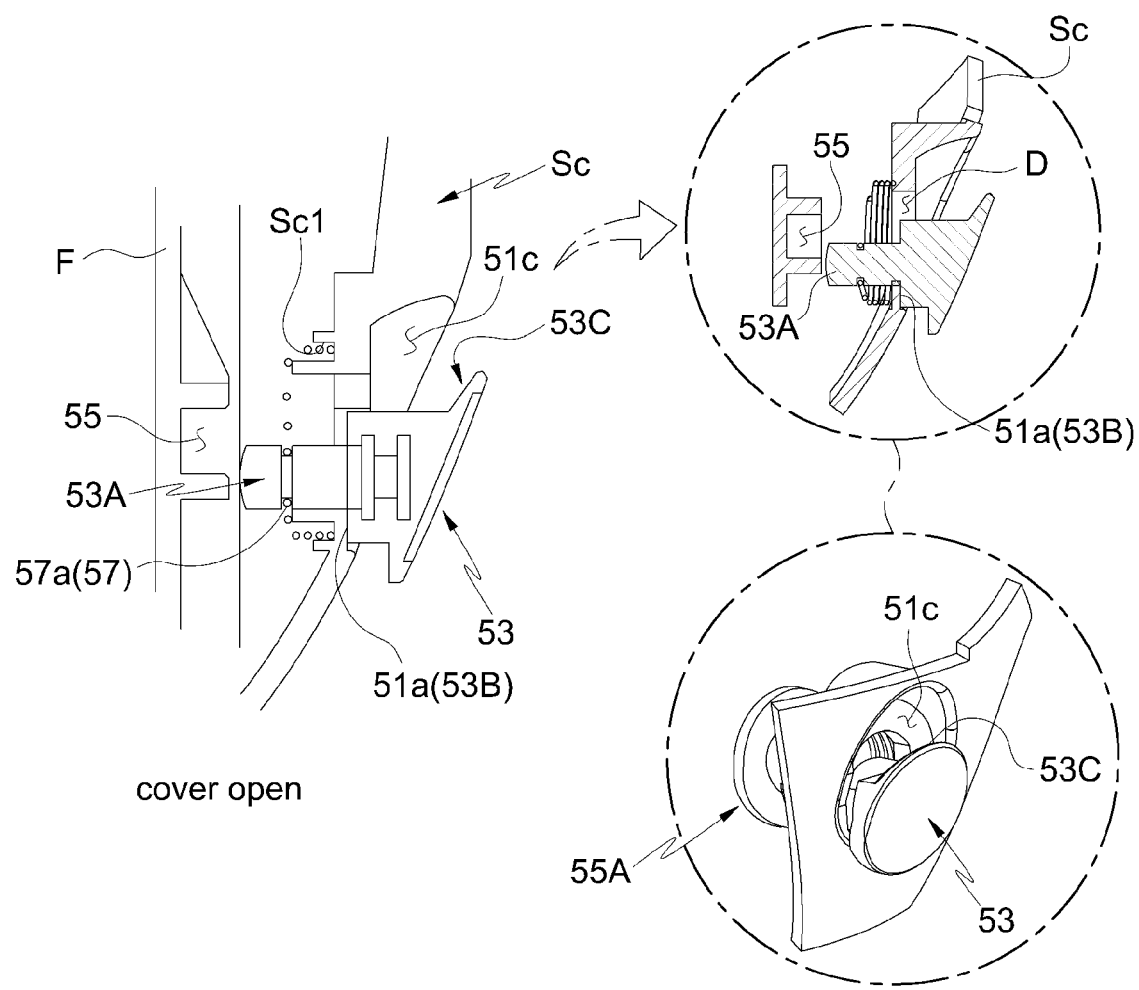

When the lock 53 is pulled to the right (with respect to the paper surface) by inputting a finger or the like into the clearance 51c which is formed between the first side cover Sc and the grip 53C of the lock 53 in order to convert the first side cover Sc from the closed state in FIG. 2A into the open state in FIG. 2B, the coil spring 57 having a fastening hook 57a which is coupled to the fastening recess 53a of the locking rod 53A contracts between the inner surfaces of the first side cover Sc that forms the mounting part. Consequently, the left end of the locking rod 53A of the lock is separated from the locking hole 55 of the hole member 55A, thereby being converted into the state in which the first side cover can be separated.

In sequence, when the lock 53 is moved down in order to fix the state in which the locking rod 53 is separated from the locking hole 55, the fitting body 53B of the lock is seated on and coupled to the fitting portion 51a of the mounting part 51 below the reciprocating hole 51b, so that a fisher can unlock the lock with one hand. In this state, the fisher can press against and manipulate the first side cover Sc, which stays in the coupled state due to a specific coupling structure of the frame F and the first side cover Sc, with one hand in order to separate the first side cover Sc from the frame F. In this case, the first side cover is completely separated from the frame, is rotated about an open shaft which is offset to one side into a position where it is suspended, or is suspended from the frame using a connecting string which serves to prevent the first side cover from being lost.

In this coupling between the fitting body of the lock and the mounting part, since the cross-sectional area of the reciprocating hole 51b of the mounting part 51 is greater than the cross-sectional area of the locking rod 53A, when a guide rod 53b of the fitting body 53B that has a cross-sectional area and shape (a cross-sectional shape similar to an ellipse obtained by cutting opposite arc portions of a circle) corresponding to the cross-sectional area and shape of the reciprocating hole 51b for the purpose of allowing the lock to reliably move to the right moves out of the reciprocating hole, the locking rod 53A having a smaller cross-sectional area can move inside the reciprocating hole 51b. In the state in which the locking rod 53A is coupled to the locking hole 55, when the locking rod moves in the direction in which it moves away from the axis "X" (see FIG. 2A) (i.e. when the locking rod moves in the direction in which the fitting portion of the mounting part is coupled to the fitting body of the lock), the first cover can be fixed in the open state.

The operation of moving the lock 53 in the direction in which the fitting portion of the mounting part is coupled to the fitting body of the lock (the lock being movable in any radial direction about the axis "X") can be expressed as up-down lifting. A separation portion D which is defined due to the difference between the cross-section area of the reciprocating hole 51b of the mounting part 51 and the cross-section area of the locking rod 53A (see the schematic cross-sectional view in the right circle drawn with the dashed dotted line in the right part of FIG. 2B) can be referred to as 'an up-down lift displacement means' for the fitting body of the lock.

The 'up-down lift displacement means' can have any configuration in addition to the separation portion D. For instance 'up-down lift displacement means' can be configured such that it separates a block which forms the grip 53C and the fitting body 53B from the lock 53, moves the block up and down with respect to the lock, and returns the block to the original position using a variety of elastic members.

After the side cover is returned to the original position and is coupled to the frame by repairing or replacing the fishing line or adjusting the braking force of a brake system, the fitting body 53B of the lock 53 is separated from the fitting portion 51a of the mounting part by lifting up the fitting body 53B. Then, one end of the locking rod 53A of the lock 53 is coupled again to the locking hole 55 and returns to the locked state.

Since the grip 53C of the lock is protruded in the open state of the first side cover (even when the first side cover is coupled to the frame), the user can easily recognize that the lock has not stayed in the locked state and thus can lock it firmly with confidence.

In addition, a slope can be introduced between the locking rod and the fitting body of the lock in place of the shown stepped structure. When moving the lock from the unlocked state to the locked state, the guide rod 53b can more easily enter the reciprocating hole 51b of the mounting part again, irrespective of the difference in the cross-sectional areas between the locking rod 51A, which has a smaller cross-sectional area, and the guide rod 53b, which has a greater cross-sectional area.

In addition, according to the present invention, as shown in FIG. 4 to FIG. 9, the lock can be modified such that the first side cover and the lock form one combined structure or assembly 30 (hereinafter, referred to as a cover assembly), and the side cover can be adapted to close all of the side portions of the frame such that the cover assembly 30 opens or closes the side portions of the frame depending on the displacement of the lock For this, according to the present invention, as shown in FIG. 4 to FIG. 6B, a locking means which rotates a modified lock 31 so that the cover assembly 30 opens and closes is provided.

Figure 6A:
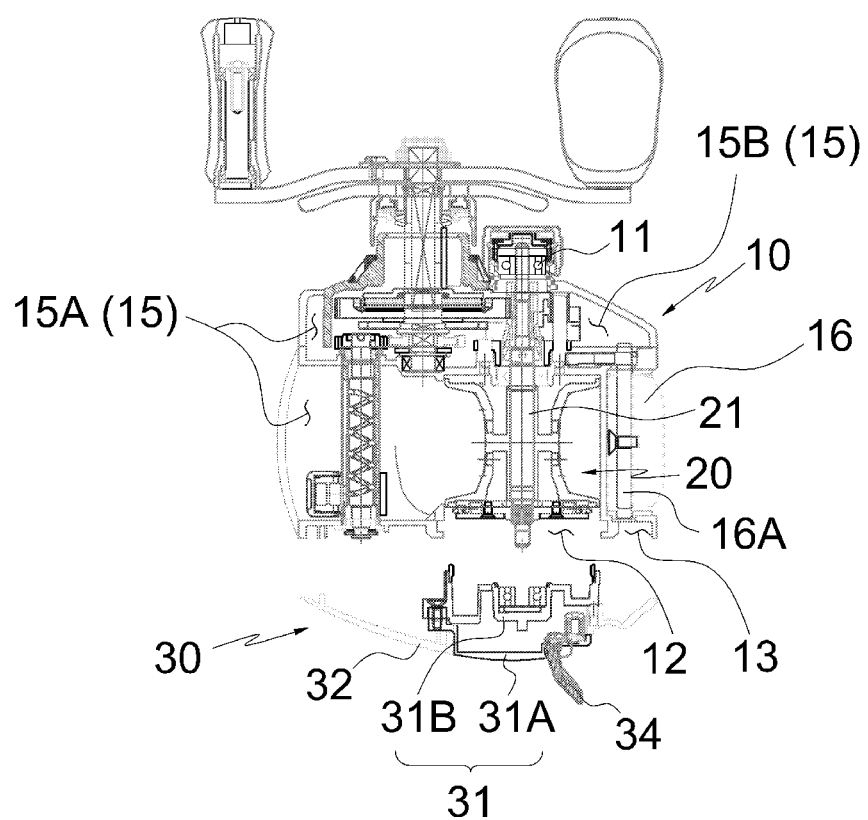
Figure 6B:
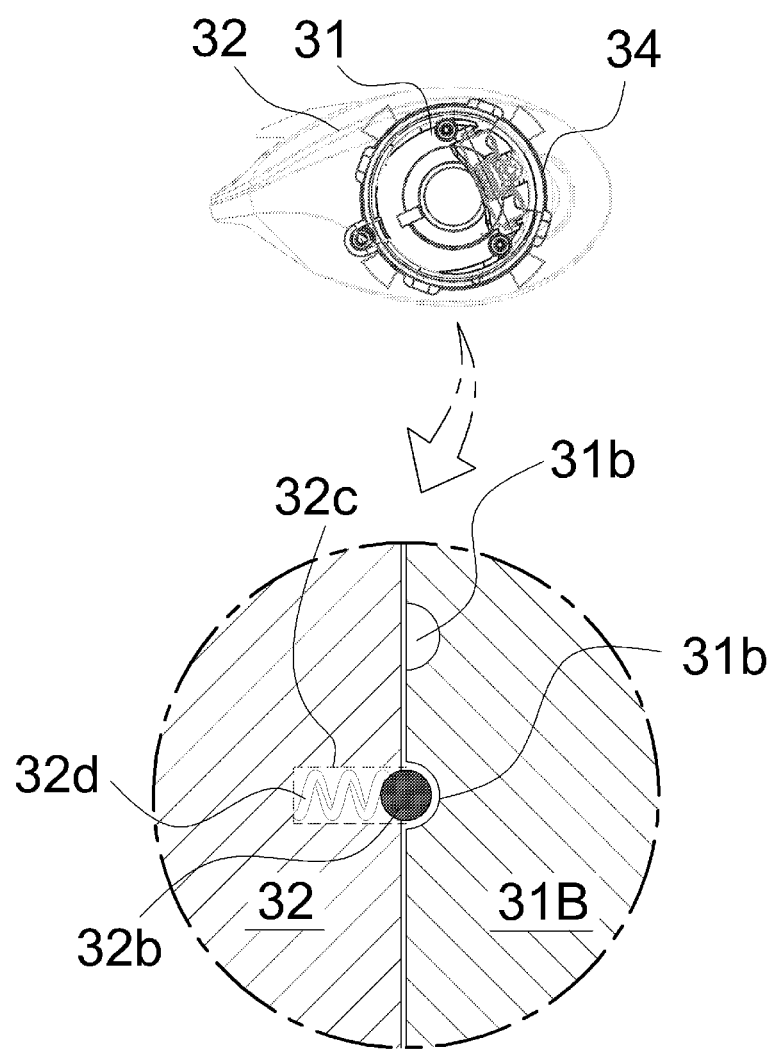

As shown in FIG. 6A and FIG. 6B, the cover assembly 30 is locked and unlocked through a coupling protrusion 33 which is formed on the lock 31 and a counterpart member 13a which is formed in the coupling part 13 of the frame 10 and to which the coupling protrusion 33 is fastened.

The shape, number and position of the coupling protrusion 33 and the counterpart member 13a are not limited and they can be realized in a variety of shapes. Therefore, the shape, number and position of the coupling protrusion 33 and the counterpart member 13a are not limited herein, since a person having ordinary skill in the art can fully estimate and reproduce them.

As shown in FIG. 4 to FIG. 6B, the locking means of the present invention includes a grip 34 and an elastic support means. The grip 34 is coupled to the lock such that it swings in the lateral direction. The elastic support means is disposed inside the lock 31, and when the grip 34 has completely swung in one direction for unfolding or folding, causes the swing of the grip 34 to stop at one of the unfolded state and the folded state. Accordingly, the lock 31 can be easily rotated, that is, be easily locked and unlocked.

Since the grip 34 is configured such that it swings outward, the user can lock and unlock the lock 31 by rotating the grip 34 after holding the grip 34.

In addition, for the purpose of the lateral swing of the grip 34, the grip 34 includes a holding portion 34A, a head portion 34C connected to the holding portion 34A and swing shafts 34B protruding from both ends of the head 34C, and coupling holes (not shown) are formed in the outer surface of the lock 31 such that the swing shafts 34B are hinge-coupled thereto.

Preferably, the grip 34 is coupled to the lock 31 in the recessed shape in order to satisfy a trend in fishing reels, that is, a preference for a small and simple profile, and the holding portion 34A has an input recess into which the user can insert a finger.

When the grip 34 is coupled to only the lock 31 in the recessed shape, the rocker 31 may rotate when the user presses against and rotates the lock 31 with a palm or the like. This may cause the cover assembly to be separated, which is problematic.

In particular, when the user is fishing in excessively active fishing environment, such as when fishing on a ship at sea, he/she often holds a fishing rod with both hands. When the user presses against the entire portion of the lock 31 with the palm or the like so that the lock rotates during fishing, the cover assembly may be separated against his/her intention, which is problematic.

Therefore, the present invention is designed such that the grip 34 is recessed into and integrated to the cover assembly in order to prevent the lock 31 from rotating freely while satisfying the preference for a small and simple profile.

Figure 7A:
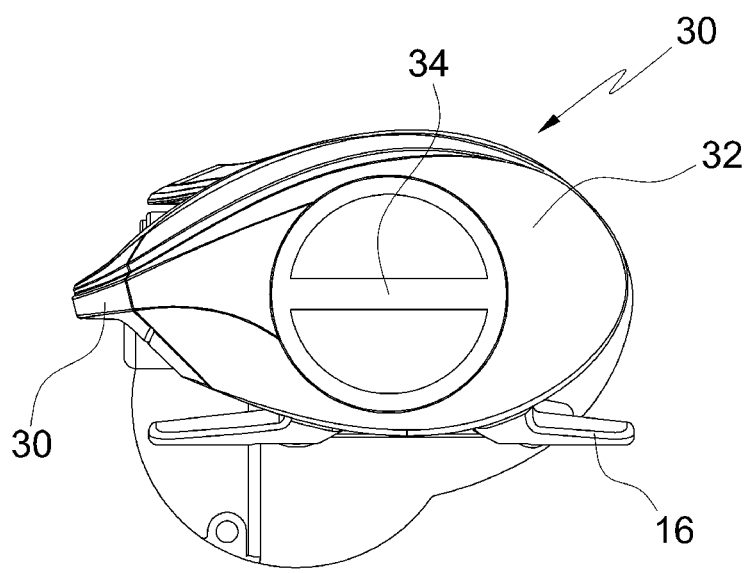
FIG. 7A, FIG. 7B, FIG. 8A and FIG. 8B are views explaining the operational states of the fishing reel according to an embodiment of the present invention.
Figure 7B:
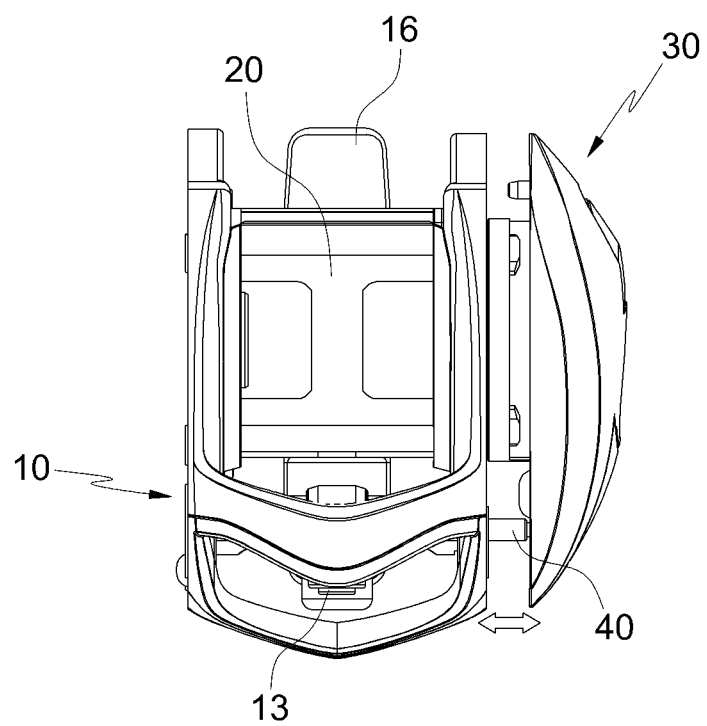
Figure 8A:
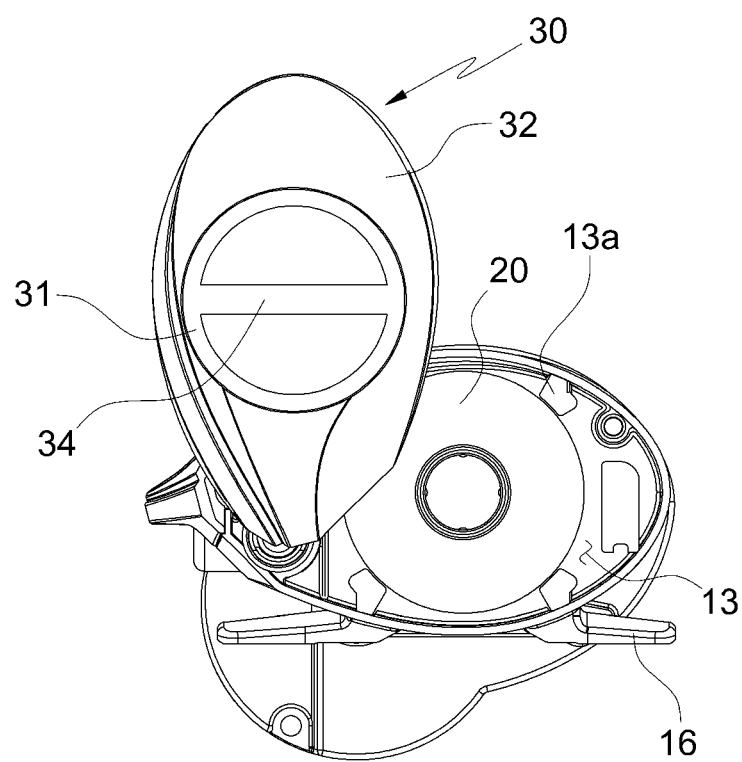
Figure 8B:
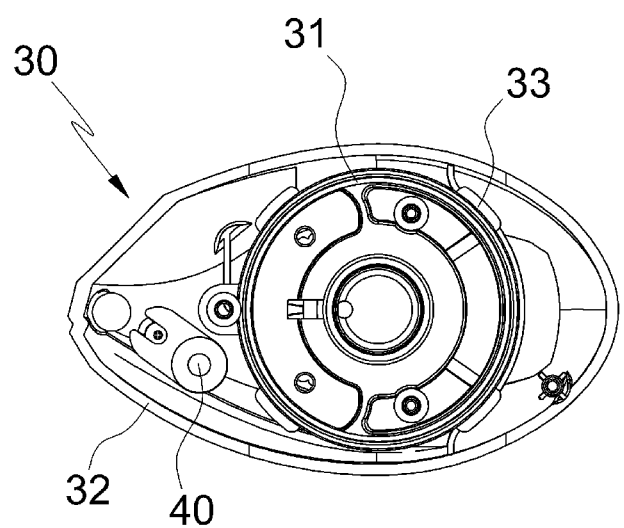

For this, as shown in FIG. 7A, FIG. 7B, and FIG. 9, the lock 31 and the first side cover 32 have accommodation recesses 31a and 32A in which the grip 34 can be received.

Accordingly, in the state in which the grip 34 is received in the accommodation recesses 31a and 32A, that is, the grip 34 is folded, the grip 34 is stopped by the first side cover 32, whereby the lock 31 is prevented from rotating and is in the locked state.

In addition, when the user operates the grip 34 to fold or unfold it in the excessively active fishing environment as described above, a situation where the user cannot continuously hold the grip 34 may occur. In some cases, it is required to keep the grip 34 in the folded or unfolded state. According to the present invention, it is possible to promote the convenience of the user by enforcing the swing complete state, i.e. the unfolded state or the folded state, of the grip 34 using the elastic support means.

For this, as shown in FIG. 9, the elastic support means of the present invention includes a plurality of elastic bodies that enables the grip 33 to snap. First, a holding protrusion 34a protrudes from the inner surface of the head portion 34C of the grip 34. The elastic support means includes a leaf spring 37 having a contact portion 37A which contacts the holding protrusion 34a and applies an elastic force in the outward direction.

The leaf spring 37 has a support portion 37B connected to the contact portion 37A. An elastic bending portion 37C is formed between the contact portion 37A and the support portion 37B.

Accordingly, when the grip 34 is swinging, the holding protrusion 34a presses the contact portion 37A in the direction opposite the elastic force. When the swing is finished, the contact portion 37A presses against one end of the holding protrusion 34a in response to the elastic force of the leaf spring 37 so that the grip 34 cannot swing in the opposite direction. Accordingly, the user can keep the grip in the folded, unfolded or unlocked state (in particular, in the unlocked state), which is very convenient.

In addition, when a corner of the holding protrusion 34a rotates a predetermined distance, the contact portion 37A of the leaf spring 37 presses against one end of the holding protrusion 34a, which is in the direction opposite to the direction of rotation. Accordingly, the user can very easily lock and unlock the grip 34 by quickly pressing the grip 34.

The leaf spring 37 achieves the elastic force using the elastic folding portion 37C. When the grip 34 is frequently swung (locked and unlocked) in the state in which the support portion 37B is simply locked to the lock 31, the elastic folding portion 37C may be unfolded in the opposite direction, thereby decreasing the elastic force.

Accordingly, the present invention employs a coil spring 38 which is coupled to the support portion 37B and elastically supports the leaf spring 37 in the outward direction.

The support portion 37B is provided with a coupling hole 37d to which the coil spring 38 is coupled. The coil spring 38 can be coupled in the state in which distal end of the coil spring 38 is fitted into the coupling hole 37d, or as shown in FIG. 9, the support portion 37B and the elastic folding portion 37C are fitted into a clearance of the coil spring 34.

In addition, a bolt member 39 is coupled to a screw hole (not shown) of the lock 31 through a hollow area of the coil spring 38 and the coupling hole 37d in order to fix the leaf spring 37 to the lock 31.

Furthermore, the present invention employs a holding means which restricts excessive rotation of the lock 31 and, after the rotation is finished, keeps the lock in the rotation-finished state, whereby the user can easily separate and assemble the cover assembly.

As shown in the enlarged projection views in the lower part of FIG. 5A, FIG. 5B, FIG. 6A, and FIG. 6B which schematically show the coupling relationship of the cover assembly, the holding means includes a ball member 32b which is formed around an opening of the first side cover 32 and is elastically supported in the inward direction and rotary recesses 31b which are provided in the lock 31 at positions corresponding to coupling and decoupling positions of the coupling protrusion 33 and the counterpart member 13a. The ball member 32b is inserted into the rotary recesses 31b.

The lock 31 includes an outer part 31A and an inner part 31B which are coupled to each other. The rotary recesses 31b are formed in one end of the inner part 31B of the lock 31. When the lock 31 rotates, one end of the inner part 31B presses the ball member 32b in the outward direction while rotating.

Afterwards, when the ball member 32 arrives at another rotary recess 31b, the ball member 32 is elastically supported in the inward direction, thereby preventing the lock 31 from excessively rotating and keeping the lock 31 in the rotation-finished state.

For lateral movement of the ball member, the first side cover 32 preferably has an insertion hole 32c in the inner surface into which the elastic body 32d which elastically supports the ball member 32 is inserted.

Although it is illustrated in the figure that the coil spring type elastic body 32d is inserted into the insertion hole 32c, this is illustrated only for the sake of easy explanation. It should not be understood that the present invention is limited thereto. It is apparent to a person having ordinary skill in the art that the holding means can be implemented as any elastic body that can apply an elastic force.

Figure 3A:
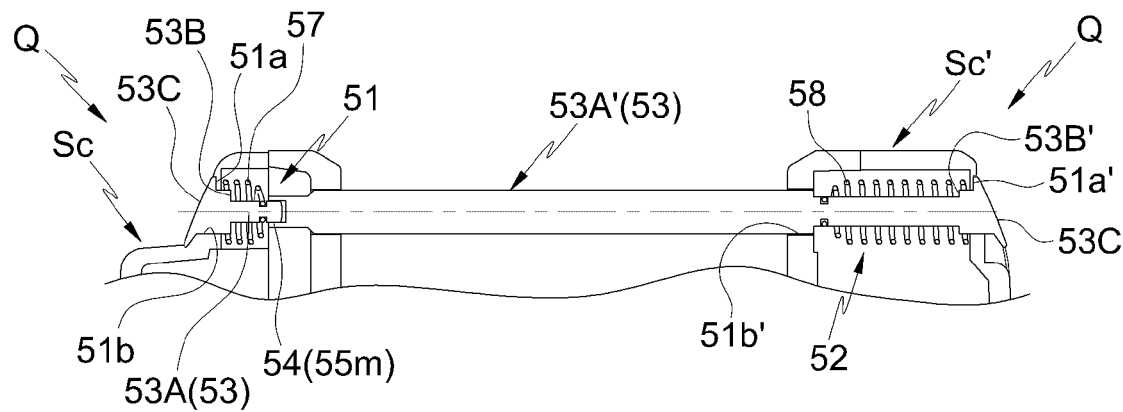
FIG. 3A, FIG. 3B, FIG. 3C and FIG. 3D are views showing the key parts of fishing reels having a quick-opening side cover according to modified embodiments of the present invention.

Next, referring to FIG. 3A which schematically shows the key parts, a modified fishing reel is provided. In this modified fishing reel, the first and second locking rods 53A and 53A' are provided in both sides of the first or second side cover Sc or Sc'. With this configuration, when the grip 53C of any one of the locking rods 53A and 53A' is pulled, the first side cover Sc can be opened, thereby significantly improving convenience.

For this modified fishing reel, the first side cover Sc has the first mounting part 51, and the second side cover Sc' has a second mounting part 52. Each of the mounting parts 51 and 52 has the reciprocating hole 51b.

In the lock 53, the first and second locking rods 53A and 53A' are coupled with the reciprocating holes 51b of the mounting parts 51 and 52 such that they can advance and retreat, and each grip 53C is connected to each locking rod. Like the basic fishing reel shown in FIG. 1A and FIG. 1B, each grip 53C has each fitting body 53B. The fitting portions 51a and 51a' corresponding to the fitting bodies are provided in the first and second side covers.

Each of the first and second locking rods 53A and 53A' employs an elastic means which applies an elastic force in the direction in which the locking tip 54 disposed at one end of the first locking rod (alternatively, the locking tip 54 can be employed in the second locking rod) and a locking hole 55m disposed in the second locking rod (alternatively, the locking hole 55m can be employed in the first locking rod) are coupled with each other.

Figure 1B:
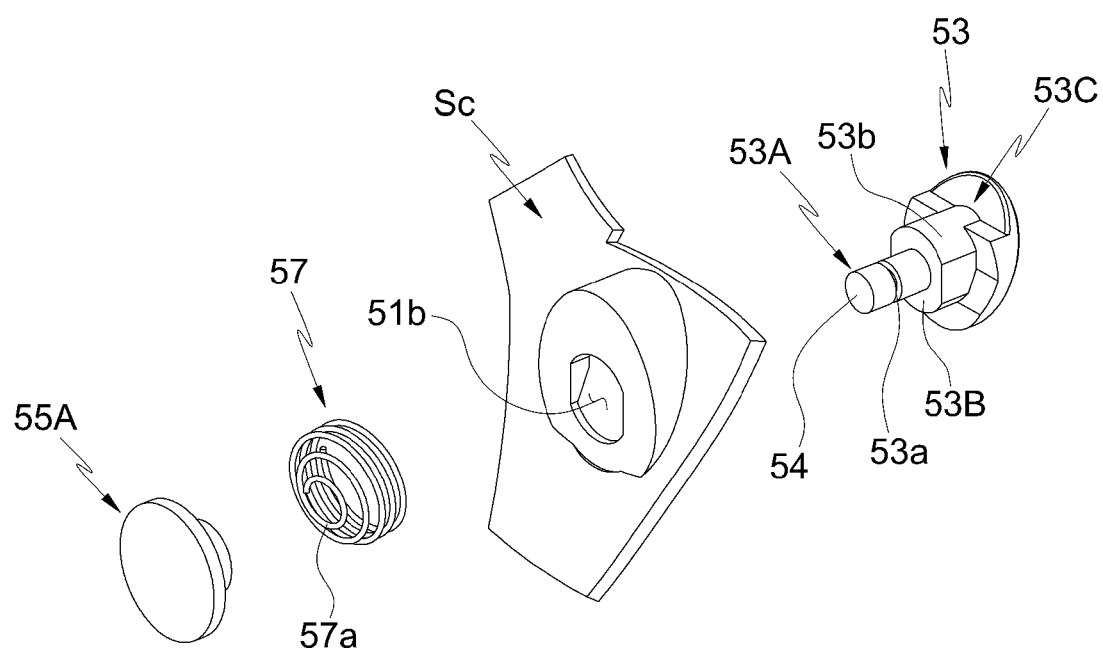

Like the basic fishing reel shown in FIG. 1A and FIG. 1B, the elastic means includes the coil spring 57, in which one end of the coil spring 57 gradually decreases in diameter so as to be coupled into each fastening recess of the locking rods 53A and 53A', and the other end of the coil spring 57 is supported against each inside wall of the first and second side covers Sc and Sc' which have the mounting parts 51 and 52.

A description of the operation of the modified quick-opening system Q is omitted, since it is substantially identical with that of the quick-opening system of the basic fishing reel shown in FIG. 1A and FIG. 1B (The modified embodiment in FIG. 3A can be regarded that it has the second locking rod by modifying the hole member having the locking hole, and the second locking rod has also the function of the second hole member). However, in the modified embodiment shown in FIG. 3A, the fitting portion of the mounting part and the fitting body of the lock can be omitted as required, and the shape of the grip can also be variously modified.

The assembly in which the first and second locking rods are combined includes a plurality of part bodies which are coupled to each other. The assembly can be a telescopic type that can be stretched and contracted, and be slidably coupled to the frame 10.

Figure 3B:
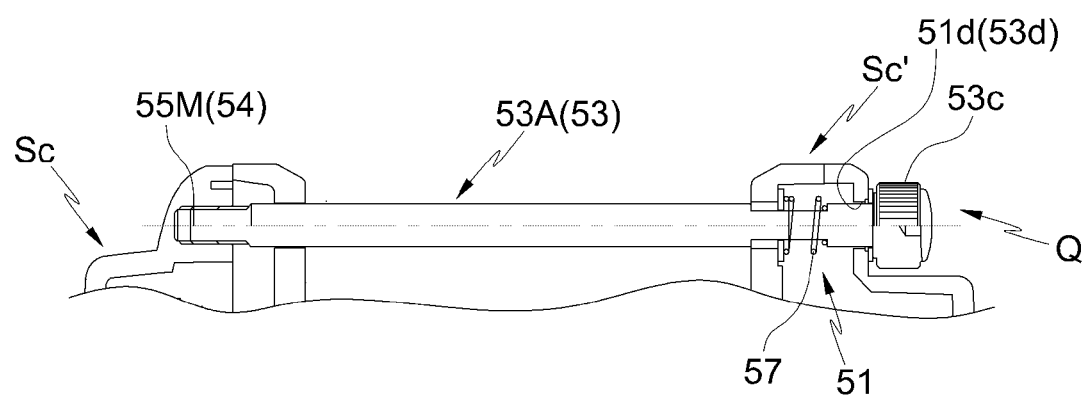
Figure 3C:
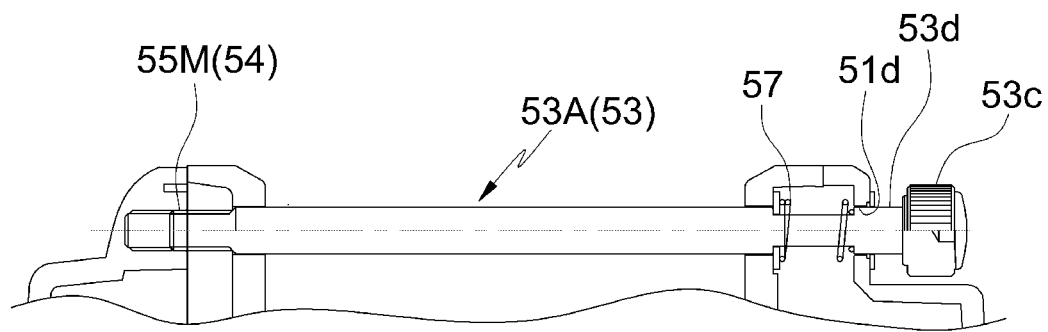
Figure 3D:
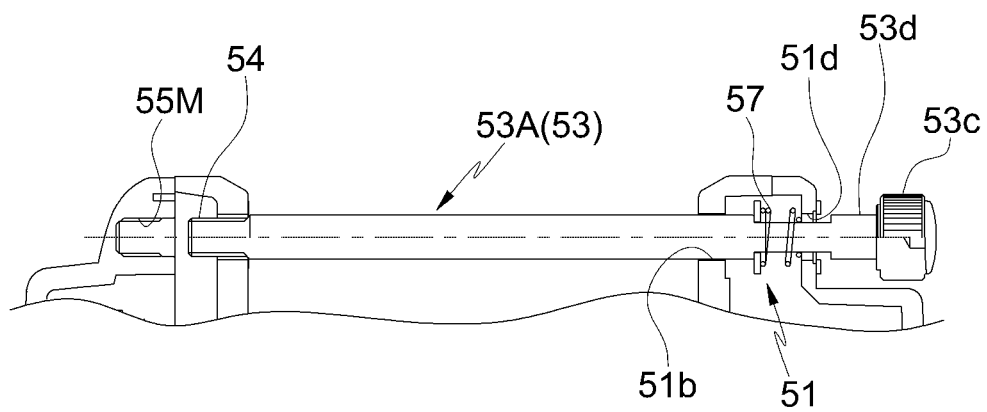
Figure 4:
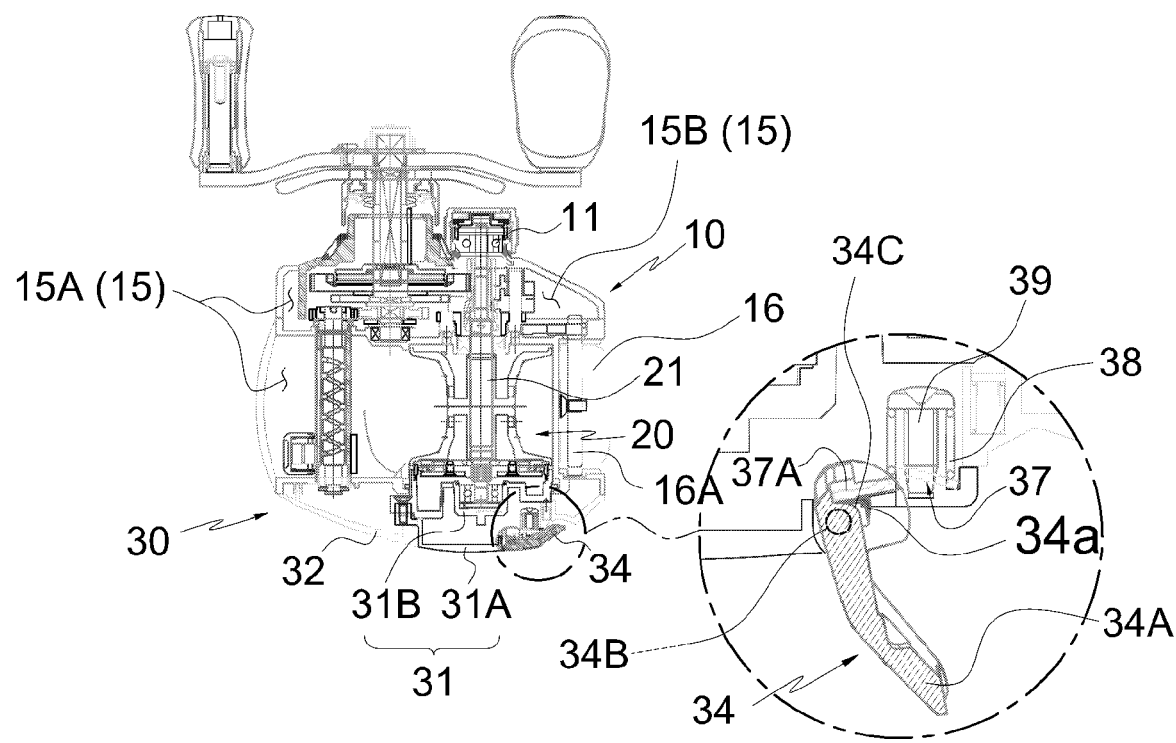
FIG. 4, FIG. 5A, FIG. 5B, FIG. 6A, and FIG. 6B are views distinctively showing the operations of the fishing reel according to an embodiment of the present invention.
Figure 5A:
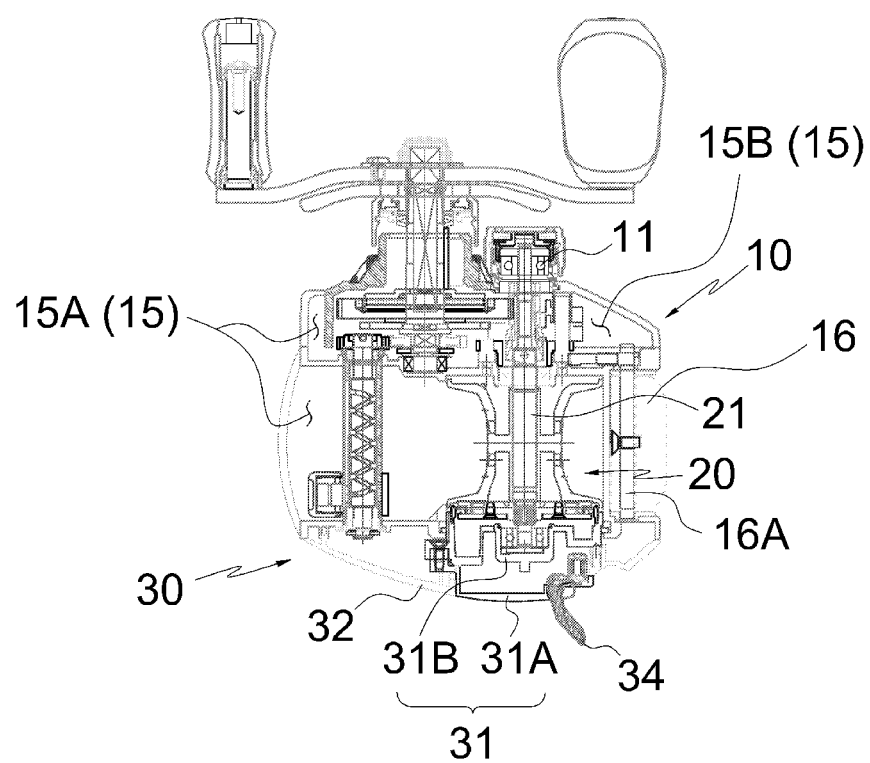
Figure 5B:
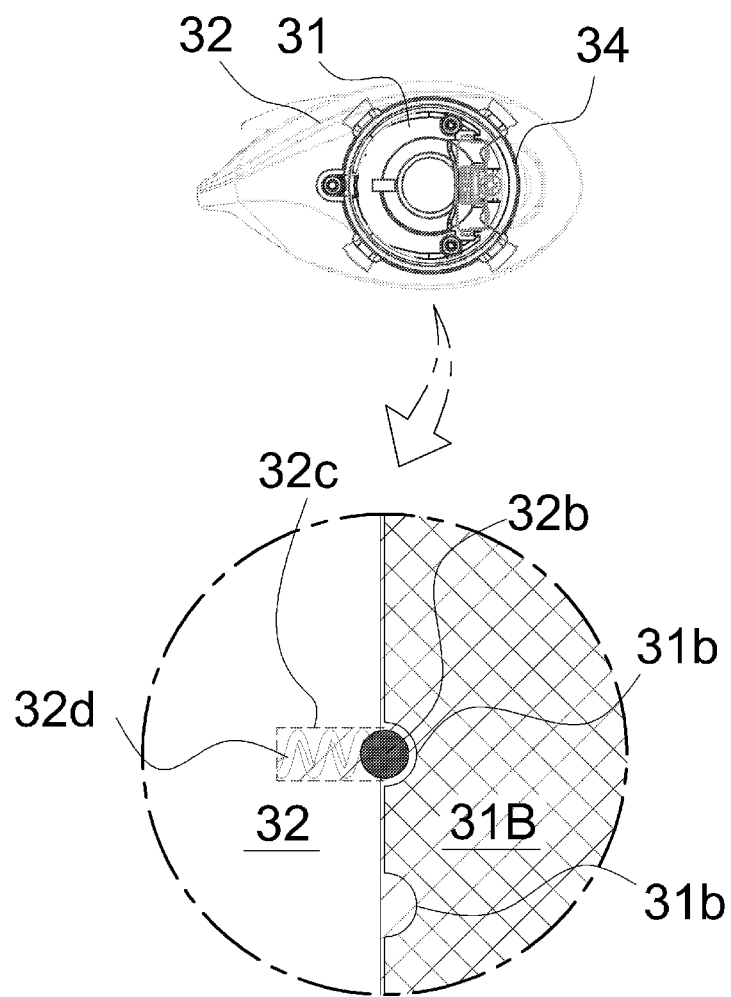

FIG. 3B, FIG. 3C, and FIG. 3D schematically show the sequential operational states of the key parts. FIGS. 3B to 3D show another modified embodiment of the quick-opening system Q of the fishing reel which is intended to prevent the first side cover from being accidently opened in a variety of situations during fishing by allowing the unlocked state to be easily recognized.

In the modified quick-opening system Q, the lock 53 can be regarded as an improvement of the lock 53m inside the upper central circle drawn with the dashed dotted line in FIG. 1A and FIG. 1B.

The first side cover Sc has the locking hole 55M (the second side cover Sc' can employ the locking hole as required), which is coupled with one end of the locking rod 53A, i.e. the locking tip 54. The mounting part 51 having the reciprocating hole 51b is provided in the second side cover Sc' (the mounting part can be employed in the first side cover as required).

The shape of the grip 53c of the lock 53 is modified such that anti-slip knurls are formed so that it can be easily rotated.

The locking rod 53A is provided with the elastic means, in particular, the coil spring 57 in the space inside the second side cover Sc'. The elastic means applies an elastic force in the direction in which the locking tip 54 at one end of the locking rod is coupled to the locking hole 55M.

For this, the right end of the coil spring 57 is coupled to the locking rod (coupling using the fastening hole in FIG. 1A and FIG. 1B is applicable), and the left end of the coil spring is coupled to the second side cover inside the area of the mounting part 51.

The elastic means can be configured as required such that it applies an elastic force in the direction in which the locking tip 54 at one end of the locking rod is separated from the locking hole 55M. For instance, elastic means can be configured such that the right end of the coil spring 57 is coupled to the locking rod and the left end of the coil spring 57 is coupled to the second side cover inside the area of the mounting part 51, whereby it can apply an elastic force that pushes the locking rod to the right.

In the former case, even though a male thread 53d which is provided on the left part of the grip 53c is disengaged and separated from a female thread 51d of the second side cover Sc' by turning the locking rod 53A, the locking tip 54 at the left end of the locking rod is not separated from the locking hole 55M, as shown in FIG. 3C. When the grip 53c is pulled again, the locking tip 54 is separated from the locking hole 55M, as shown in FIG. 3D.

However, in the latter case, when the male thread 53d provided on the left part of the grip 53c is disengaged and separated from the female thread 51d of the second side cover Sc' by turning the locking rod 53A, even though no external force is applied (even though the grip 53c is not required to be pulled), the elastic repulsion of the elastic means 57 causes the locking tip 54 at the left end of the locking rod to be separated from the locking hole 55M, as shown in FIG. 3D, from the state shown in FIG. 3C in which locking tip 54 is coupled to the locking hole 55M.

This mechanism of separating the locking tip from the locking hole depending on the direction in which the elastic means applies an elastic force can be similarly applied when a modified structure (not shown) is provided. Specifically, in the modified structure, the mounting part is provided in the first side cover, the grip of the lock is exposed from the outside, i.e. from the left, of the first side cover, the locking hole is provided in the first side cover (or the frame) (the locking rod is shorter as in FIG. 1A and FIG. 1B) or in the second side cover (the locking rod is longer as in FIG. 3B).

The direction in which the elastic member applies an elastic force to the locking rod in FIG. 3B to FIG. 3D is not specifically limited.

As described above, the locking rod and the first side cover (or the second side cover or the frame) is provided with a screw-coupling part such that the first side cover can be opened by disengaging the male thread from the female thread and pulling the locking rod. Even though the locking hole and the locking tip are coupled in the case of locking (when the elastic force of the elastic means is applied to the locking rod in the direction in which the locking tip is coupled to the locking hole), the grip of the lock is exposed to the outside of the side cover unless the male and female threads are coupled with each other by turning the locking rod (or grip), so that the fisher can identify the unlocked state and properly couple the male and female threads to each other. Accordingly, in this modified embodiment, it is possible to prevent the first side cover from being accidently opened and to lift the first side cover in the unlocked state.

While well-known techniques related to the detailed structure of a variety of fishing reels are omitted in the foregoing description, a person having ordinary skill in the art can easily estimate, deduce and reproduce them.

The foregoing descriptions of the present invention have been given to illustrate the fishing reel and the quick-opening system that have a specific shape and structure with reference to the drawings. It is apparent that a person having ordinary skill in the art can make various modifications, changes and equivalent other embodiments therefrom. It should be understood that such modifications, changes and equivalents fall within the scope of the present invention.

What is claimed is:

1. A fishing reel comprising:
    a frame;
    a shaft disposed in the frame;
    a spool axially disposed on the shaft, wherein a fishing line is wound on the spool;
    a first side cover provided at a side of the frame, the first side cover being openable for separation from the spool;
    a second side cover arranged opposite the first side cover, the second side cover being coupled to the frame; and
    a quick-opening system, wherein the quick-opening system comprises:
        a mounting part provided in the first side cover, and having a fitting portion and a reciprocating hole;
        a lock comprising a locking rod which advances and retreats along the reciprocating hole of the mounting part and a fitting body connected to the locking rod, wherein the fitting body is coupled to the fitting portion when the first side cover is opened;
        a locking hole which couples with one end of the locking rod, the locking hole being provided in one of the frame and the second side cover; and
        an elastic means, wherein the elastic means is coupled to the lock so as to apply an elastic force in a direction in which the locking rod of the lock is coupled to the locking hole,
    wherein the fitting body of the lock comprises an up-down lift displacement means.

2. The fishing reel according to claim 1, wherein
    the lock comprises a grip, and
    the mounting part has a clearance which allows a finger to reach the grip.

3. The fishing reel according to claim 1, further comprising a locking means for rotating the lock so that the first side cover opens or closes the side of the frame, wherein the locking means includes:
    a grip which is coupled to the lock so as to swing in a lateral direction; and
    an elastic support means disposed inside the lock, wherein, when the grip has completed swinging in one direction for unfolding or folding, the elastic support means causes the swing of the grip to stop at one of an unfolded state and a folded state.

4. The fishing reel according to claim 3, wherein
    the grip comprises a holding portion, a head portion connected to the holding portion, a swing shaft protruding from both ends of the head and a holding protrusion protruding from an inner surface of the head portion, and
    the elastic support means comprises a leaf spring having a contact portion which applies an elastic force in an outward direction while contacting the holding protrusion.

5. The fishing reel according to claim 4, wherein the leaf spring has a support portion connected to the contact portion thereof, and the elastic support means comprises a coil spring which is coupled to the support of the leaf spring to elastically support the leaf spring in an outward direction, and
wherein a bolt member for fixing the leaf spring and the coil spring to the lock is provided, the bolt member being coupled to a screw hole of the lock through a hollow area of the coil spring and a coupling hole of the support portion.

6. The fishing reel according to claim 5, wherein each of the lock and the first side cover has an accommodation recess which is recessed so as to receive the grip therein, whereby the lock is prevented from rotating and is in a locked state when received in the accommodation recess.

7. A fishing reel comprising:
a frame;
a shaft disposed in the frame;
a spool axially disposed on the shaft, wherein a fishing line is wound on the spool;
a first side cover provided at a side of the frame, the first side cover being openable for separation from the spool;
a second side cover arranged opposite the first side cover, the second side cover being coupled to the frame; and
a quick-opening system, wherein the quick-opening system comprises:
  a mounting part provided in the second side cover, and having a fitting portion and a reciprocating hole;
  a lock comprising a locking rod which advances and retreats along the reciprocating hole of the mounting part and a fitting body connected to the locking rod, wherein the fitting body is coupled to the fitting portion when the first side cover is opened;
  a locking hole which couples with one end of the locking rod, the locking hole being provided in the first side cover; and
  an elastic means, wherein the elastic means is coupled to the lock so as to apply an elastic force in a direction in which the locking rod of the lock is coupled to the locking hole,
wherein the fitting body of the lock comprises an up-down lift displacement means.

8. A fishing reel comprising:
a frame;
a shaft disposed in the frame;
a spool axially disposed on the shaft, wherein a fishing line is wound on the spool;
a first side cover provided at a side of the frame, the first side cover being openable for separation from the spool;
a second side cover arranged opposite the first side cover, the second side cover being coupled to the frame; and
a quick-opening system, wherein the quick-opening system comprises:
  a first mounting part provided in the first side cover, and having a reciprocating hole;
  a second mounting part provided in the second side cover, and having a reciprocating hole;
  lock comprising a first locking rod which advances and retreats along the reciprocating hole of the first mounting part and a second locking rod which advances and retreats along the reciprocating hole of the second mounting part;
  a locking tip provided at one end of one of the first locking rod and the second locking rod;
  a locking hole provided in one of the second locking rod and the first locking rod; and
  an elastic means, wherein the elastic means is coupled to the first and second locking rods of the lock so as to apply an elastic force in a direction in which the locking tip and the locking hole are coupled to each other.

\* \* \* \* \*